PHASE COMPARISON CIRCUIT OF THE TYPE INCLUDING A TRIANGULAR WAVE GENERATOR

Filed Dec. 9, 1966

INVENTORS
LEON F. BLACHOWICZ
RICHARD J. WAGNER
BY
Hopgood & Calimafde
ATTORNEYS 3,495,096

A PHASE COMPARISON CIRCUIT OF THE TYPE INCLUDING A TRIANGULAR WAVE GENERATOR

Leon F. Blachowicz, St. Petersburg, and Richard J. Wagner, Largo, Fla., assignors to Electronic Communications, Inc., St. Petersburg, Fla.

Filed Dec. 9, 1966, Ser. No. 600,505
Int. Cl. H03k 5/20
U.S. Cl. 307—232 2 Claims

ABSTRACT OF THE DISCLOSURE

A phase comparison circuit of the type including a triangular wave generator is described. The first signal is converted into a square wave and fed to a switched integrator having an RC circuit. The capacitance of the RC circuit is paralleled and split across a transistor which is switched in response to pulses under control of the second signal source. When the transistor is conducting the capacitors are additive; with the transistor open, the trailing transistor remains constant. At this latter period of time, a sampling is effected.

Figure 1:
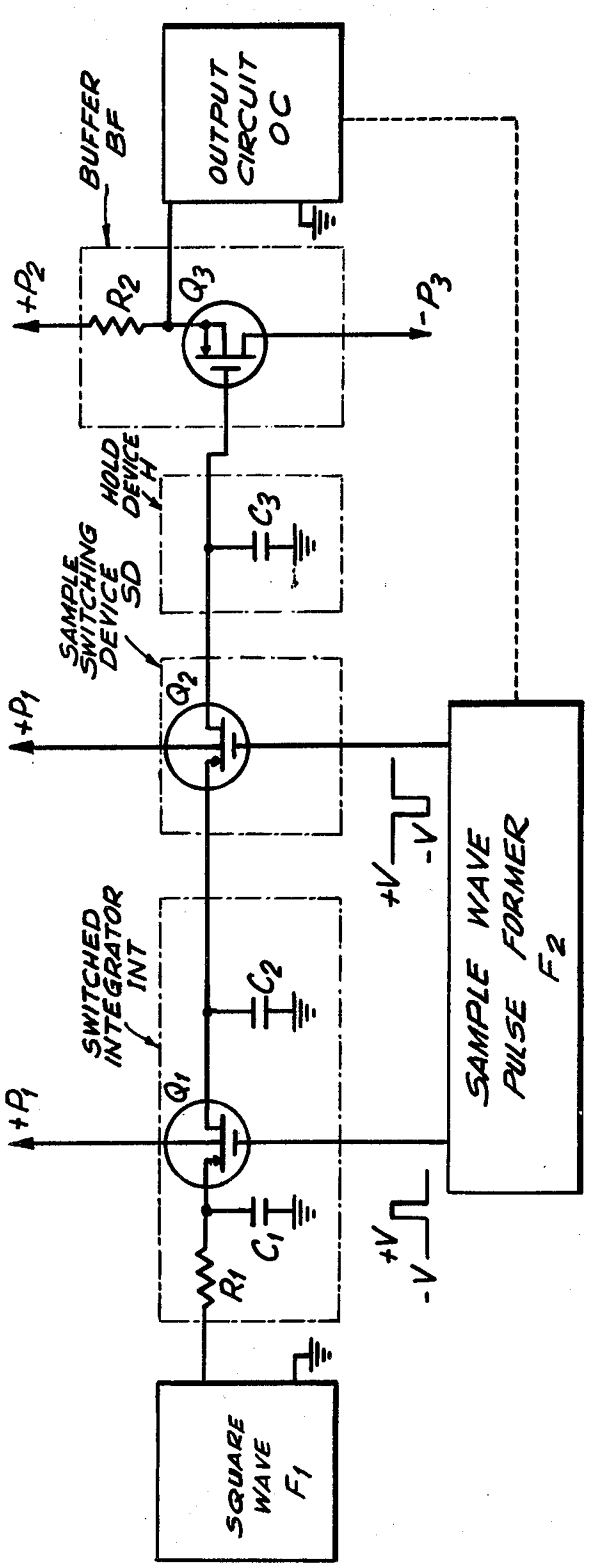

This invention relates generally to a signal phase comparison circuit, and in particular to a circuit for producing a D.C. voltage proportional to the phase difference between two digital signals. The phase difference contemplated may be either instantaneous, where the frequencies are unequal, or it may be a difference over an extended period of time where the frequencies are the same.

Conventional phase detectors to accomplish the foregoing result exist in many forms. Since, however, the comparison is to exist between alternating current signals and primary interest resides in a pure D.C. output, the magnitude of the A.C. noise in the output of the phase detector, caused by the signal inputs, creates a problem which is not easily resolved. For example, while the best conventional systems (excluding those of extreme complexity) reduce the output noise, including spikes and spurious A.C. signals, to at least 60 db. down, sophisticated frequency synthesizers, for example, require an even cleaner D.C. voltage at the output.

An exemplary prior art digital phase detector is of the so-called flip-flop type where two signals ($F_1$ and $F_2$) are presented at the set and re-set inputs of the flip-flop bistable. By switching the circuit "on" with the $F_1$ pulses of one train, and "off" with the $F_2$ pulses of the second train, the phase difference between the two pulse trains will be reflected in the average value or duty cycle of the output voltage. The chief asset of the foregoing arrangement is its extreme simplicity. It may be implemented by operating upon both trains of repetitive signals (whether they be sine wave, triangle wave, etc.) so that they are suitable to operate the flip-flop. A pair of square wave trigger circuits would suffice.

Since this flip-flop created output is of the duty-cycle type, it includes a large A.C. component at the fundamental frequency. While it is possible to derive a signal-to-noise figure based upon the ratio of the average voltage to the A.C. component and then supplement the circuit with a filter to suppress the A.C. component, it is desirable to avoid suppressing the dynamic response of the phase detector. The use of a large filter would effect just such an undesirable result since it would suppress any output indicating a changing phase between the two signals. This necessarily occurs when the rate of phase change approaches filter cut-off.

In order to improve upon the foregoing arrangement and achieve the functional result desired, the so-called sample and hold phase detector was derived. With this type of arrangement, one of the signals is converted into a triangle wave. This may be most easily accomplished by use of a resistor-capacitor integrating the network operating on a square wave. While the result will have some exponential quality, a careful choice of time constants will, for all intents and purposes, produce a triangular shape. The second frequency wave form is employed to operate a switch which instantaneously couples the triangle wave to a capacitor. The length of time that the switch is closed (closed being the coupled position) is small relative to the total time.

In other words, frequency $F_2$ is converted to a narrow pulse train at the fundamental frequency which is employed to momentarily close a switch and charge a capacitor to whatever voltage level the triangle wave has achieved at the time. Opening the switch allows the capacitor to remain at this voltage (assuming no loading). Observation of the voltage through a very high impedance network gives a very high D.C. content signal whose value reflects the phase difference between $F_1$ and $F_2$. This necessarily follows since the pulse $F_2$ samples the value of the triangle wave at the same voltage each time (assuming the same frequency between $F_1$ and $F_2$). Where, on the other hand, the phase changes between the two frequencies as a result of either a change in phase of either of the frequencies or a change in either of the frequencies themselves, a linear voltage versus phase characteristic will result.

While the latter arrangement represents a considerable advance over the flip-flop type phase detectors, a close analysis of the effects of the finite switching pulse width reveals a dynamic condition which produces an undesirable A.C. component in the output.

To illustrate, assume steady state condition (using the term broadly) with the D.C. output reflecting the difference in phase between $F_1$ and $F_2$ the latter producing the switching or sampling pulses. At the end of the sampling period, the capacitor voltage is charged to a point on the slope on the triangle wave existing at that time, say $V_1$. The sampling switch now opens and remains open until the next $F_2$ pulse. Since this pulse is finite in width, the sampling of the triangle wave starts again at a period in time before that which it ended in the preceding cycle. Sampling thus initiates at some voltage $V_2$ where $V_2$ is less than $V_1$ by an amount which equals the pulse width times the slope of the trinagle wave. Since the capacitor is instantaneously applied across this lower voltage $V_2$ and it is itself charged to the voltage $V_1$, it tends to discharge backwards across the switch until a short time later within the cycle when the voltage build-up on the slope reaches $V_1$ again.

Thus, the output even with the constant phase difference between two signals produces a D.C. voltage with periodic A.C. spike shape depressions at a frequency $F_2$. This ripple component has been observed to be as much as 60 db. down. Nevertheless, it exists and precludes the application of this type of circuit as a component in sophisticated circuitry. While filtering could suffice in some applications to obviate the ripple component, a more satisfactory solution would be to produce a phase detector which did not originate the ripple in the first place, since filter size is also a consideration.

Accordingly, it is the object of this invention to provide a phase detector of the type which represents the difference in phase between a pair of signals with a D.C. voltage having an extremely low noise content.

It is a further object of this invention to provide a phase detector of the type which produces a linear voltage versus phase characteristic over a range of at least $\pm\pi/2$ radians.

It is a further object of this invention to achieve the foregoing objects with a simple, easy-to-maintain phase detector which does not require large filtering components.

Briefly, the invention is predicated upon the suppression of the sample pulse frequency in the detector output by obviating the finite aperture time conventionally existing in sampling the triangle wave occurring at the first frequency. Specifically, the invention provides an arrangement for halting the effective motion of the triangle wave during the sampling period.

The above mentioned and other features and objects of this invention and the manner of attaining them will become more apparent and the invention itself will best be understood by reference to the following description of an embodiment of the invention taken in conjunction with the accompanying drawings wherein:

FIG. 1 schematically illustrates one embodiment of the present invention, and

Figure 2:
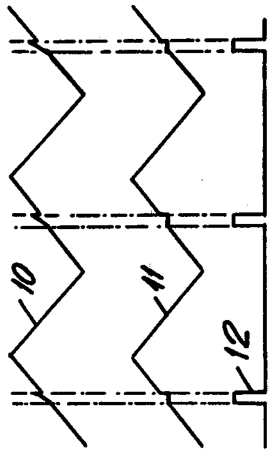

FIG. 2 is a graphic representation of the pulses existing at various points in the network of FIG. 1.

Turning now to the figures, and in particular, to FIG. 1, the disclosed embodiment assumes that the input signal train $F_1$ and $F_2$ have been respectively converted to a repetitive square wave and a repetitive pulse at the respective fundamental frequencies of the initiating waves. The manner in which this is accomplished is not critical and since arrangements for effecting square waves and pulses from repetitive signals are well known, they will not be described herein. Suffice to say, there is made available a square wave by means shown in block form at a frequency $F_1$ and a pulse by means also shown in block form at a frequency $F_2$. The pulse former includes both the normal and inverted form of pulse emanating from a pair of terminals.

The square wave signal at frequency $F_1$ is fed into the switched integrator INT which converts the square wave function available at the input into a triangular wave. Transistor $Q_1$ is normally closed and effects a switching function in response to pulses from the second signal source pulse former $F_2$. Preferably, transistor $Q_1$ is of the field effect type which has the desirable high impedance. Its particular bias voltages are represented by +P (the bias voltages on the other trasistors are similarly designated by the letter P). With transistor $Q_1$ conducting, capacitors $C_1$ and $C_2$ are additive in value and perform the normal integrating function in conjunction with the resistor $R_1$.

The output available across capacitor $C_2$ of the switched integrator INT is that shown by curve 11 of FIG. 2. Curve 12 represents the pulses emanating from the left hand output of the pulse former. With transistor $Q_1$ conducting and a square wave being applied to the input of the integrator, resistor $R_1$ and capacitor $C_1$ and $C_2$ perform their normal function producing initially a ramp function across capacitor $C_2$. When the leading edge of an $F_2$ pulse is applied to transistor $Q_1$ at the gating electrode, transistor $Q_1$ shuts down and the voltage across capacitor $C_2$ remains constant as shown in FIG. 2. Thus, the triangular wave is for the moment standing still.

Because the period of time represented by the width of the sampling pulse is also employed via the second output of the pulse former $F_2$ to close transistor $Q_2$ of the sample switching device SD; this is the period when sampling takes place to charge capacitor $C_3$. Since capacitor $C_3$ is essentally unloaded (for reasons which will be explained), capacitor $C_3$ seeks a voltage equal to that impressed upon capacitor $C_2$. Since the voltage impressed upon capacitor $C_2$ is constant for the sampling period, the voltage upon capacitor $C_3$ remains constant.

The output from capacitor $C_3$ is fed to the gate electrode of a field effect transistor $Q_3$, and thence to the output utilization circuit OC. Transistor $Q_3$ in its shown configuration acts as a high impedance buffer BF in order to insure that the output circuit does not load the holding device H (capacitor $C_3$).

Referring again to the sampling period, when capacitor $C_2$ is effectively disconnected from the square wave source, capacitor $C_1$ is charging at a greater rate than normal due to the absence of capacitor $C_2$. The voltage build-up across capacitor $C_1$ during this period is illustrated by the dashed-line-enclosed portions of curve 10 of FIG. 2. When the sampling period has ended, capacitors $C_1$ and $C_2$ and their differing voltages (see curves 11 and 12) are instantly paralleled. The net effect (and this has no effect on the output circuit since sampling is no longer taking place) is for the voltage to reassume a value between $C_1$ and $C_2$; this is that voltage which would have obtained had no disconnect taken place. In other words, the ramp function reassumes its normal value on the forward slope of the triangle wave.

To recapitulate, the conventional triangle wave generator has been replaced by a novel switchable integrator, which in the described embodiment, includes a pair of capacitors, the output capacitor of which is disconnected from the input square wave for the sampling period, thereby maintaining its voltage constant so that sampling may take effect without transients being introduced. When sampling has been concluded, the capacitor which remained connected to the square wave source is reconnected to the output capacitor of the integrator. Since the capacitor which remained connected to the square wave source achieved a higher voltage than it would have had it been in parallel with the capacitor which has been switched out of circuit, it causes upon the closing of the switch (at the conslusion of the sampling period), the ramp function to continue as it would ordinarily.

Thus, it may be seen that the system described may exhibit effectively an infinite rejection of the sample pulse frequency, where in a conventional sample phase detector, the non-stationary voltage input to the sampler always produced noise at the sample pulse frequency and its harmonics.

While the principles of the invention have been described in connection with specific apparatus, it is to be clearly understood that this description is made only by way of example and not as a limitation to the scope of the invention as set forth in the objects thereof and in the accompanying claims. For example, while the disclosed embodiment provides a specific type of integrator and specific type of active elements, namely, field effect transistors, many alternatives will be apparent to those skilled in the art. Further, while the invention has been described specifically with reference to a digital phase detector, it may also be applied to the phase detection of analog signals so long as the analog signals are converted in the manner described to a square wave and pulse source respectively.

What is claimed is:

1. A circuit for comparing the phase between a pair of signals and for producing a D.C. voltage in proportion thereto, said circuit comprising
   - integrating means for converting a first of said signals into a triangular wave, said integrating means including
   - first switch means controlled by the second of said signals, effective when actuated by said second signal to establish an instantaneous level of said triangular wave,
   - voltage-storing means, and
   - second switch means also controlled by said second signal, operatively interposed between said integrating means and said storing means, and effective when actuated by said second signal to operatively connect said integrating means and said storing means, thereby to sample and store said instantaneous level of said triangular wave on said storing means; wherein said integrating means comprises first and second capacitors, and said first switch means being effective when actuated by said second signal to operatively connect said first and second capacitors in parallel.

2. The circuit claimed in claim 1 wherein said first and second switch means comprise first and second transistors, respectively, and said storing means comprises a third capacitor, operatively connected to said second transistor, said second transistor being effective when actuated to connect said second and third capacitors in parallel.

References Cited

UNITED STATES PATENTS

| | | | |
|---|---|---|---|
| 2,868,975 | 1/1959 | Harris et al. | 328—133 X |
| 3,014,182 | 12/1961 | Hallon | 328—133 X |
| 3,333,109 | 7/1967 | Dike | 329—103 X |
| 3,314,014 | 4/1967 | Perkins | 328—134 |

JOHN S. HEYMAN, Primary Examiner

J. D. FREW, Assistant Examiner

U.S. Cl. X.R.

307—233, 251; 328—133